United States Patent [19]
Kubota

[11] Patent Number: 5,604,569
[45] Date of Patent: Feb. 18, 1997

[54] IMAGE FORMING METHOD EXERTING JOULE HEAT ON AN IRRADIATED PORTION OF A PHOTOCONDUCTIVE LAYER, AND AN APPARATUS USED FOR SUCH A METHOD

[75] Inventor: Hiroshi Kubota, Yamatotakada, Japan

[73] Assignee: Sharp Kabushiki Kaisha, Osaka, Japan

[21] Appl. No.: 503,450

[22] Filed: Jul. 17, 1995

[30] Foreign Application Priority Data

Jul. 27, 1994 [JP] Japan ................................. 6-175407

[51] Int. Cl.$^6$ ............................................ G03G 15/00
[52] U.S. Cl. ........................... 399/232; 430/31; 399/233
[58] Field of Search ......................... 355/210, 211, 355/212, 246, 245, 256, 282, 219; 430/31–35, 58, 84, 95

[56] References Cited

U.S. PATENT DOCUMENTS

| | | | |
|---|---|---|---|
| 4,047,804 | 9/1977 | Stephens | 350/164 |
| 4,470,055 | 9/1984 | Todoh | 346/140.1 |
| 5,172,163 | 12/1992 | Yamaoki et al. | 355/210 |
| 5,291,246 | 3/1994 | Tsukamoto | 355/210 |
| 5,432,033 | 7/1995 | Asanae et al. | 430/35 |

FOREIGN PATENT DOCUMENTS

| | | |
|---|---|---|
| 54-157627 | 12/1979 | Japan . |
| 63-220178 | 9/1988 | Japan . |
| 3-212658 | 9/1991 | Japan . |
| 4-455 | 1/1992 | Japan . |
| 6-175441 | 6/1994 | Japan . |

*Primary Examiner*—Thu A. Dang
*Attorney, Agent, or Firm*—David G. Conlin; William J. Daley, Jr.; Kevin J. Fournier

[57] ABSTRACT

An image-forming method using a latent-image forming body which consists of a transparent electrode layer, a photoconductive layer, an electrode layer and a pyroelectric-material layer made of a dielectric substance that are successively stacked on its transparent base. In this method, conductive carriers are generated in the photoconductive layer by irradiating information light thereto by using a light source that is placed at a location opposite to the transparent base. Then, heat is exerted at the light-irradiation portion of the photoconductive layer by applying a voltage across the transparent electrode layer and the electrode layer, and the heat causes a temperature rise in the pyroelectric-material layer such that an electrostatic latent image is formed by the pyroelectric effect. The electrostatic latent image is developed by allowing the developer, charged to have the polarity reversed to that of the electrostatic latent image, to be attracted by the electrostatic latent image. Thus, the image-forming method requires neither a heater such as an expensive thermal head, nor a charger used for the latent-image forming body, and also does not use expensive developer having conductivity and magnetism. This makes it possible to form images at low costs.

15 Claims, 5 Drawing Sheets

IMAGE FORMING METHOD EXERTING JOULE HEAT ON AN IRRADIATED PORTION OF A PHOTOCONDUCTIVE LAYER, AND AN APPARATUS USED FOR SUCH A METHOD

FIELD OF THE INVENTION

The present invention relates to an image-forming method for forming a latent image on the surface of a latent-image forming body and for developing the latent image, and also concerns a device used for such a method. This method and the device are applied to, for example, printers, copying machines, facsimiles and other apparatuses.

BACKGROUND OF THE INVENTION

In electrophotographic printing machines which have been widely put into practice previously, several efforts have been made in order to simplify their image-forming processes.

Figure 7:
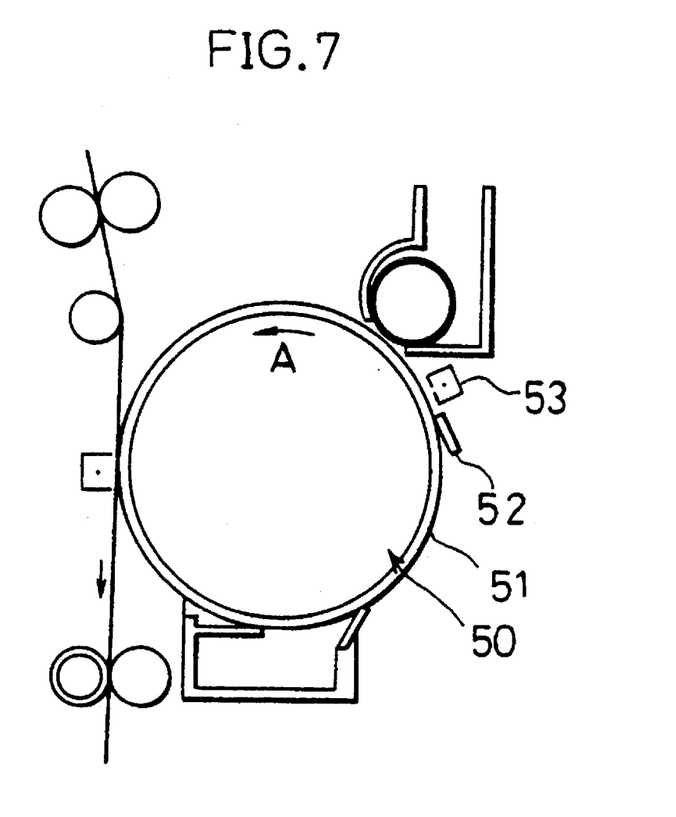
FIG. 7, which shows a conventional example, is a schematic side view of a printer to which its image-forming method is applied.

For example, as shown in FIG. 7, Japanese Laid-Open Patent Publication, No. 302274/1989 (Tokukaihei 1-302274), has disclosed a method wherein a latent-image forming body 50 having a ferro-electric layer 51 on its surface and a thermal head 52 are used and by utilizing the fact that the dielectric constant of the ferro-electric substance varies with temperature, an electrostatic latent image is formed. In other words, in this electrostatic-latent-image forming method, information is written to the ferro-dielectric layer 51 by making the thermal head 52 cause temperature changes locally on the ferro-electric layer 51. Immediately after the information has been written thereto, the written portion is charged by a corona charger 53. At this time, since the ferro-electric layer 51 has its dielectric constant changed depending on temperatures, the electric potential of the drum surface of the latent-image forming body 50, caused by the charge, becomes smaller at heated portions and also becomes relatively greater at the other portions. Thus, an electrostatic latent image is formed by utilizing these temperature differences. Here, this phenomenon which exerts electric potentials on the surface in response to temperature changes is referred to as the pyroelectric effect. With this method, the service life of the latent-image forming body 50 is lengthened by eliminating the necessity of the exposing means.

Figure 8:
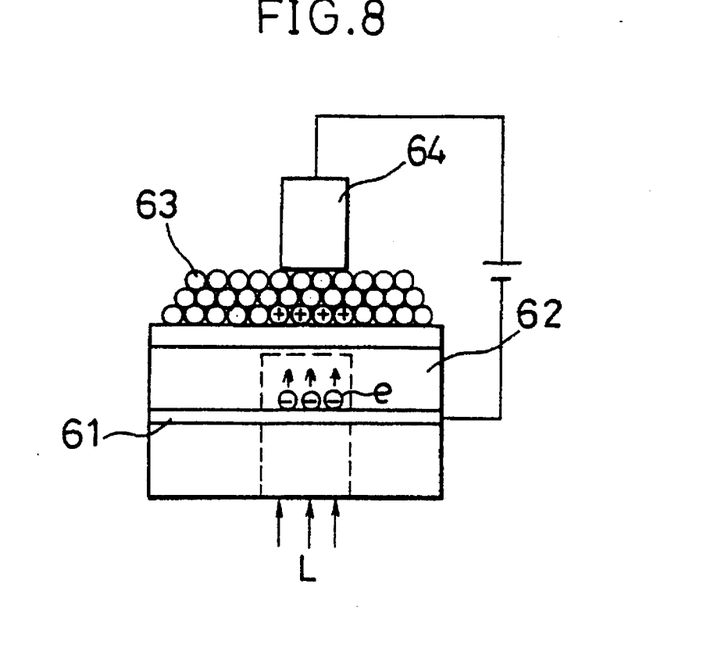
FIG. 8, which shows another conventional example, is an explanatory drawing that indicates its image-forming method.
Figure 9:
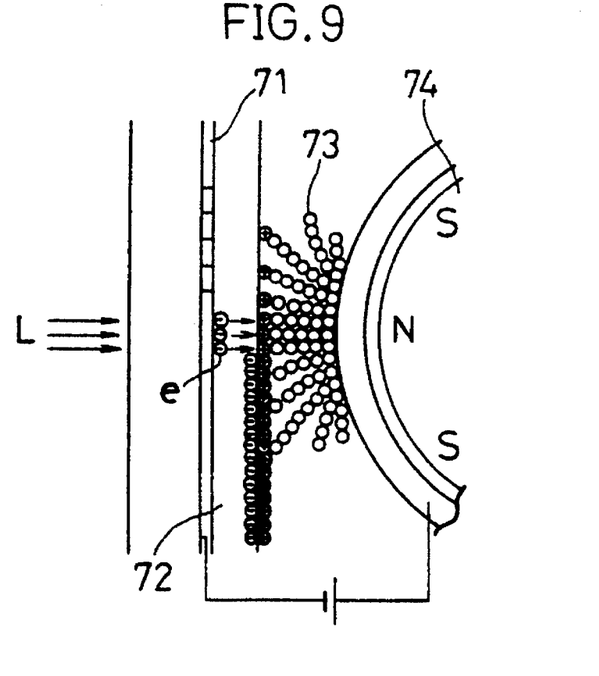
FIG. 9, which shows still another conventional example, is an explanatory drawing that indicates its image-forming method.

Meanwhile, as shown in FIG. 8 and FIG. 9, Japanese Examined Patent Publications, No. 4900/1990 (Tokukouhei 2-4900) and No. 64864/1991 (Tokukouhei 3-64864), have disclosed a method wherein conductive carriers e are generated in a photoconductive layer 62 or 72 by irradiating light L from the back of a transparent electrode 61 or 71 and an image is formed by attracting conductive toner 63 or 73 that has been subjected to injection of charge. The conductive toner 63 or 73, used in this image formation, exhibits magnetism, and is carried toward attracting portions through a magnetic force exerted by a magnet 64, a magnet roller 74, or other members.

However, in the former method of the above-mentioned conventional image-forming methods wherein the changes in dielectric constant in the ferro-electric substance, caused by temperature changes, are utilized, it is necessary to install an expensive thermal head 52 and a charging device, such as a corona charger 53, for use with the latent-image forming body 50. Therefore, the problem of this device is that the cost reduction is difficult.

Further, in the latter method, it is necessary to allow the conductive toner 63 or 73 serving as developer to exhibit conductivity and magnetism. This increases the cost of the developer, resulting in high cost in the image-forming process.

SUMMARY OF THE INVENTION

The objective of the present invention is to provide an image-forming method which realizes compactness and low cost of the image-forming apparatus by simplifying its image-forming process and also to provide an apparatus used for such an image-forming method.

In order to achieve the above-mentioned objective, the image-forming method of the present invention uses a latent-image forming body wherein a transparent electrode layer, a photoconductive layer, an electrode layer and a pyroelectric-material layer made up of a dielectric substance are successively stacked on a transparent base. Further, the image-forming method has the steps of: generating conductive carriers inside the photoconductive layer by irradiating information light into the photoconductive layer from the transparent base side by using a light source installed at an opposing position to the transparent base; forming an electrostatic latent image by applying a voltage across the transparent electrode layer and the electrode layer so that Joule heat is generated at the irradiated portion of the photoconductive layer by the light source, the heat being transmitted to the pyroelectric-material layer to cause a temperature rise in the pyroelectric-material layer so that a charge is generated on its surface because of the pyroelectric effect; and developing the electrostatic latent image by allowing developer, charged to have a polarity reversed to the electrostatic latent image, to be attracted to the electrostatic latent image.

As described above, it is necessary to change the temperature of the pyroelectric-material layer in order to exert the pyroelectric effect in the pyroelectric-material layer. In the present image-forming method, this is achieved by applying a voltage across the transparent electrode layer and the electrode layer so as to generate Joule heat at the irradiated portion of the photoconductive layer by the light source. Here, the voltage that is used to generate this Joule heat is a low voltage, for example, in the order of 200 V. Thus, the present image-forming method makes it possible to reduce the cost of the image-forming process because it requires neither a heating means, such as an expensive thermal head, nor a charging means for use with the latent-image forming body, and because it does not use expensive developer that exhibits conductivity and magnetism.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 5, the following description will discuss one embodiment of the present invention. Here, although the image-forming method and the apparatus used in the method of the present embodiment are commonly applicable to various information apparatuses, such as printers, copying machines and facsimiles, which use latent-image forming body, the present embodiment will discuss a case where the method is applied to a printer.

Figure 1:
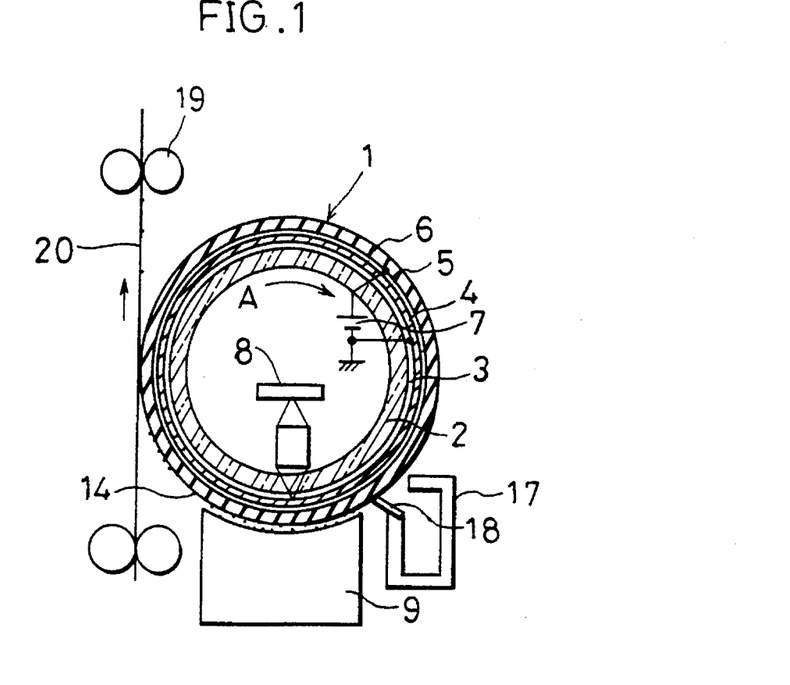
FIG. 1 is a schematic side view of a printer to which an image-forming method in one embodiment of the present invention is applied.

As illustrated in FIG. 1, a printer, which uses the image-forming method of the present embodiment, has a latent-image forming body 1 that is a rotatable cylindrical drum. Additionally, the latent-image forming body 1 is not necessarily provided as a cylindrical drum, and it may be formed into, for example, a belt shape. The latent-image forming body 1 is constituted of a transparent cylindrical base 2, which is provided as a cylindrical transparent base made of transparent resin, transparent glass, or other materials, and film layers of a transparent electrode layer 3, a photoconductive layer 4, an electrode layer 5, and a pyroelectric-material layer 6 made of a ferro-electric material, which are stacked on the surface of the base 2 in this order. In other words, the present embodiment adopts a method which utilizes the phenomenon that the pyroelectric-material layer 6, made of a ferro-electric material, is varied in its dielectric constant with temperature changes to cause charges on its surface, that is, the pyroelectric effect.

The transparent electrode layer 3 is formed by vapor deposition of ITO (Indium Tin Oxide). Further, the photoconductive layer 4, which is provided in order to generate conductive carriers upon receipt of light from an LED array 8, is preferably made of inorganic materials, such as ZnO, CdS and amorphous silicon, from the point of view of heat resistance. The film thickness of the photoconductive layer is set to, for example, 0.5 to 5 μm, but the thinner the film thickness, the better from the point of view of heat transfer efficiency to the pyroelectric-material layer 6. Here, as for the film-forming method for the photoconductive layer 4, the spattering method, CVD method, and other methods have been known in the art. Further, the electrode layer 5 is made of a vapor deposition film of, for example, aluminum.

Figure 2:
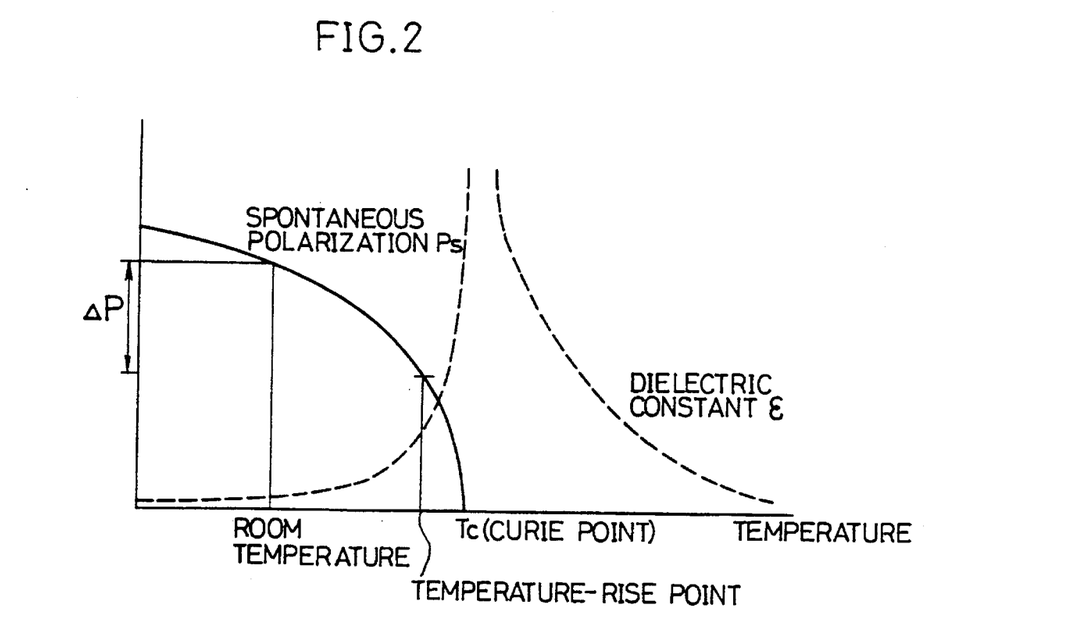
FIG. 2 is a characteristic drawing that indicates a state of spontaneous polarization of a pyroelectric-material layer that is used in the above-mentioned image-forming method.

As described above, the pyroelectric-material layer 6 is made of a pyroelectric material in order to cause the pyroelectric effect. As shown in FIG. 2, the pyroelectric effect exerts a phenomenon wherein the magnitude of polarization of the dielectric material varies with temperatures (shown by a curve indicated by a solid line in FIG. 2) and the variation ΔP between a spontaneous polarization value Ps at room-temperature point and a polarization value at temperature-rise point upon receipt of a temperature rise is observed as a surface electric potential. Here, the spontaneous polarization is referred to as a state where polarization occurs in the material itself without being affected by external electric field, that is, a state where the center of positive and negative charges is offset. Normally, the spontaneous polarization is neutralized by charge that is attracted onto its surface. When the magnitude of the spontaneous polarization is varied by a temperature change, the variation ΔP appears as a surface charge.

As for the conditions of the pyroelectric material that is capable of generating a necessary and sufficient quantity of charge, it is necessary for the pyroelectric material to have a great spontaneous polarization value Ps at room temperature and also to have a Curie point Tc that is located, for example, within a range from not less than 100° C. to not more than 200° C.

More specifically, if the Curie point Tc is too low, the function of the pyroelectric material layer 6 will become too sensitive to changes in the operating environment of the apparatus, and if a material whose Curie point Tc is, for example, less than 100° C. is used, it will only provide a temperature difference from room temperature in the order of at most 70° C. Moreover, the pyroelectric material, once subjected to a temperature rise not less than its Curie point Tc, loses its spontaneous polarization, and is rendered to a state where its spontaneous polarization is not recovered even after having a temperature drop. Therefore, materials whose Curie point Tc is too low are susceptible to this problem.

In contrast, if the Curie point Tc is too high, a greater input energy is required, causing adverse effects, such as degradation in thermal response and deterioration in materials. In the case of materials whose Curie point exceeds 200° C., the limit of heat resistance of the photoconductive layer 4 might be exceeded, although they provide a sufficient difference from room temperature. Further, since the pyroelectric coefficient is rather small in the vicinity of room temperature, the efficiency tends to be lowered. Therefore, in the pyroelectric-material layer 6 of the present embodiment, those materials whose Curie point Tc is not less than 100° C. and also is not more than 200° C. are preferably selected.

More specifically, the pyroelectric-material films to be used as the pyroelectric-material layer 6 are: for example, an inorganic ferro-electric film made of lead titanate zirconate (PZT:$PbZr_{0.5}Ti_{0.5}O_{0.3}$) or other materials; an organic ferro-electric film made of polyvinylidene fluoride (PVDF) or other materials; or a film made by forming a composite material, such as PVDF/PZT wherein fine powder of lead titanate zirconate are dispersed into polyvinylidene fluoride, into a film shape with a thickness of 0.3 to 20 μm through the sputtering method and the CVD method (see "Ferro-Dielectric Thin Film Technology: Pyroelectric Thin-Film Materials, Section 3.2" written by Shiozaki, published by Science Forum Co. Ltd.). The pyroelectric-material layer 6, made of such films, provide surface electric potential in the range of 20 to 200 V through its pyroelectric effect.

Additionally, in the above-mentioned latent-image forming body 1, film formations for the respective films are carried out by the sputtering method and the CVD method. However, the film-forming methods are not intended to be limited to these methods, and other methods, such as coating, may be used. For example, the latent-image forming body 1 may be formed by another forming method as follows: A glass tube, having a thickness of approximately 0.8 mm, is prepared as the transparent cylindrical base 2, and on its surface, ITO is vapor deposited with a thickness of, for example, 2 μm as the transparent electrode layer 3. Then, this surface is coated with a paint in which powder of zinc oxide for electrophotographic use, intensifying pigment, and binder resin have been dispersed, and is dried to form the photoconductive layer 4. Next, aluminum is vapor deposited with a thickness of 1 μm to form the electrode layer 5. To this is applied a paint made by dispersing PZT fine particles into PVDF, and this is dried to form the pyroelectric-material layer 6.

As shown in FIG. 1, a power source 7 is installed in order to apply a predetermined voltage across the transparent electrode layer 3 and the electrode layer 5 so that heat is generated at a light-irradiation position on the photoconductive layer 4.

Further, inside the transparent cylindrical base 2, that is, inside the latent-image forming body 1, is installed an LED array 8 that serves as a light source for emitting light in accordance with information such as printing signals. Here, although a laser may be adopted in place of the LED array 8, it is preferable to use the LED array 8 in order to make the apparatus compact.

Figures 3A, 3B:
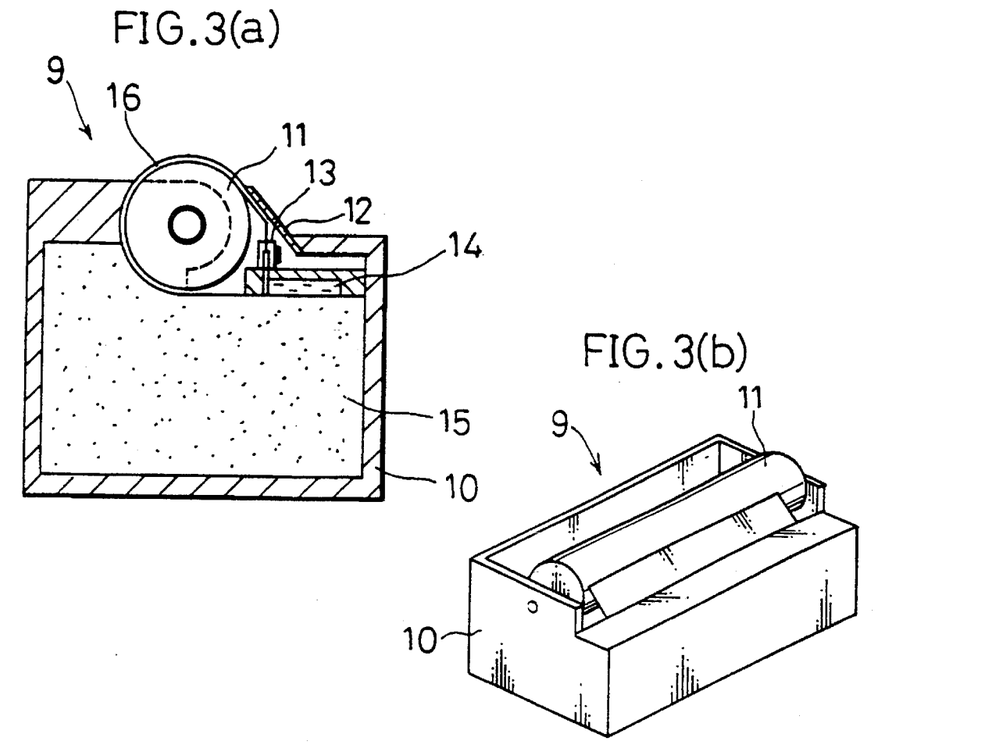
FIG. 3(a) is a schematic cross-sectional view of a developing device that is used in the above-mentioned image-forming method.
FIG. 3(b) is a schematic perspective view of the developing device that is used in the above-mentioned image-forming method.

Moreover, at a position outside the latent-image forming body 1 that is opposite the surface to be irradiated by light from the LED array 8, is installed a developing device 9 that serves as a developer-supplying means. The developing device 9 houses liquid developer 14, and supplies the liquid developer 14 to its surface facing the latent-image forming body 1. As shown in FIGS. 3(a) and 3(b), the developing device 9 is provided with a developing roller 11, a blade 12, a spray nozzle 13 and other members that are installed on the upper portion of its case 10. The liquid developer 14 is housed in the developing device 9 in an impregnated state into a porous body 15. In the developing device 9, the liquid developer 14 is sprayed by the spray nozzle 13 toward the blade 12, and is guided by the blade 12 to form a liquid developer layer 16 on the surface of the developing roller 11.

Further, as shown in FIG. 1, a waste-toner box 17 is installed on the side opposite to the rotation direction of the latent-image forming body 1 with respect to the developing device 9. The waste-toner box 17 scrapes waste developer 14 by using a cleaning blade 18 that is made of hard rubber or other materials and that is placed in contact with the latent-image forming body 1, and collects it therein.

Moreover, on the side in the rotation direction of the latent-image forming body 1 with respect to the developing device 9 is installed a paper-transporting device 19. The paper-transporting device 19 transports a sheet of paper 20 while keeping it in contact with the pyroelectric-material layer 6 of the latent-image forming body 1.

As described above, the present embodiment uses the liquid developer 14 as its developer. The liquid developer 14 is a colloidal matter that is constituted of, at least, an insulating solvent, coloring material particles, and a charge-control agent. Wet developers which are well known to the art may be adopted as the liquid developer 14, and, for example, non-polar isoparaffin hydrocarbon series or other materials are commonly used as the insulating solvent. Further, as for the coloring material particles, those made by kneading carbon black into polyethylene resin particles are adopted, and they are used in a dispersed state together with the charge-controlling agent. The average particle diameter of the colloidal particles is 0.2 μm. Here, colloid refers to a matter wherein fine particles having diameters of virtually not more than 0.5 μm are dispersed in a solvent.

Figure 4:
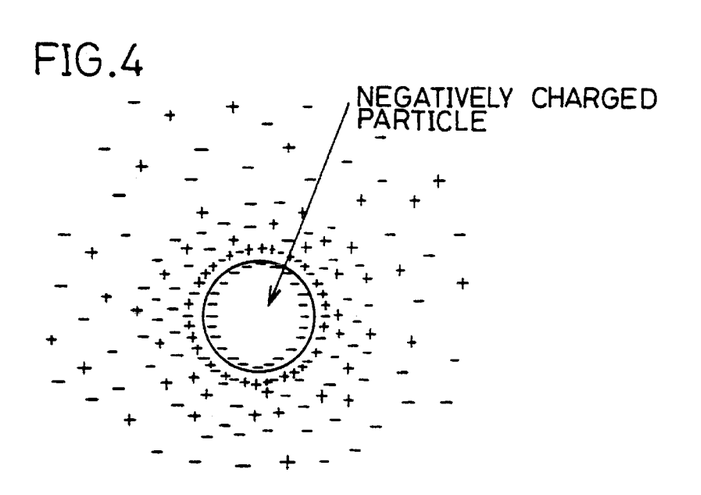
FIG. 4 is an explanatory drawing that indicates a charged state of a colloidal particle and an electrical distribution in the periphery thereof in liquid developer that is used in the above-mentioned image-forming method.

Moreover, the colloidal particles are charged to have the average quantity of charge in the range from $10^{-17}$ to $10^{-16}$ coulomb, and as shown in FIG. 4, they are negatively charged in the insulating solvent, and dispersed due to repulsion that is exerted between them because of the charged state. Additionally, solvent molecules in the proximity of the colloidal particles are positively charged. The liquid developer 14 has the following features:

(1) There is no need of charging by the use of a charging device.

(2) Its particle diameter is smaller than that of powder in the order of one tenth; this makes it possible to provide high-definition images.

(3) It is possible to easily change the quantity of charge of the particles by adding a charge-controlling agent thereto; this makes it possible to increase the quantity of charge even in the case of developing low-voltage latent images.

Additionally, the reason that the present embodiment uses not a powdered developer but a liquid developer 14 is because the liquid is more easily handled in supplying, transporting, stirring, toner-density controlling, and other processes than the powder. Moreover, in recent years, various improvements have been made on ink-supplying devices for ink-jet recording apparatuses, and the liquid processes become rather easier than the powder processes. For example, since the liquid developer 14 is impregnated into the porous body 15, no spilling is caused even if it should be reversely placed; thus, ease of handling has been achieved.

The following description will discuss an image-forming method that is carried out by using a printer having the above-mentioned arrangement.

Figure 5:
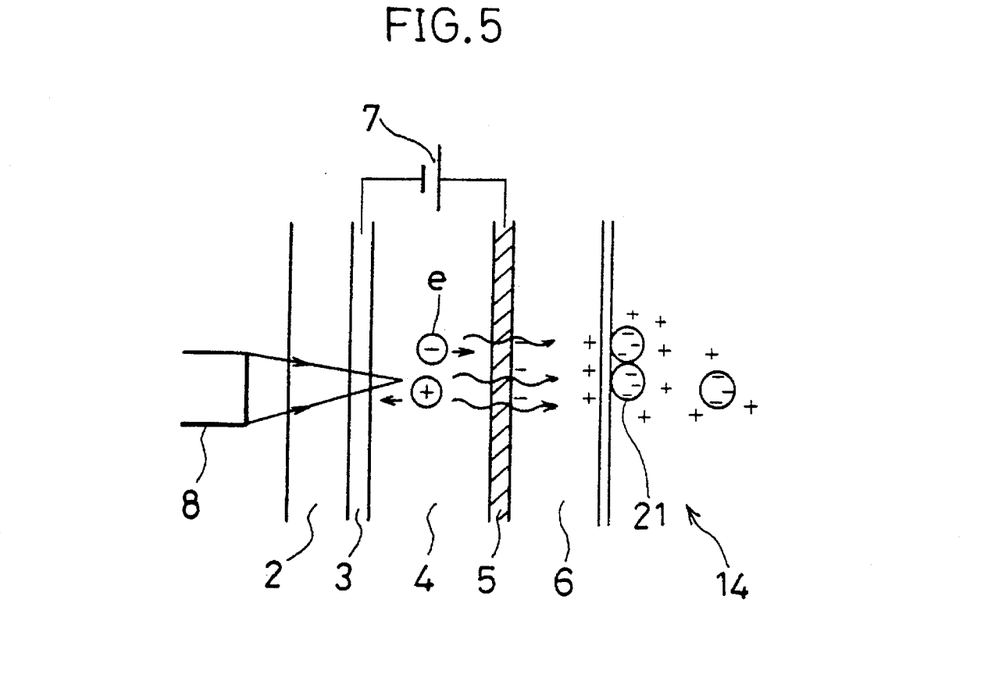
FIG. 5 is an explanatory drawing that indicates an image-forming principle in the above-mentioned image-forming method.

First, as shown in FIG. 1, in a state where the pyroelectric-material layer 6, which forms the surface of the latent-image forming body 1, is in contact with the liquid-developer layer 16 on the developing roller 11 in the developing device 9, an irradiation of light, which is representative of a printing pattern, is applied by the LED array 8 to the transparent cylindrical base 2 from the back side thereof. Thus, as shown in FIG. 5, the light, which has passed through the transparent electrode layer 3, is absorbed by the photoconductive layer 4. This causes conductive carriers of electrons e and holes in the photoconductive layer 4.

At this time, a voltage, which has been applied across the respective electrodes 3 and 5 by the power source 7, causes an electric current to flow through the portion of the photoconductive layer 4 that has been subjected to the light irradiation, thereby generating Joule heat in the portion. The heat is conducted to the pyroelectric-material layer 6 through the electrode layer 5, thereby causing a temperature rise in the pyroelectric-material layer 6. A surface charge appears in the pyroelectric layer 6 that has subjected to the temperature rise as described earlier due to the pyroelectric effect shown in FIG. 2, and a latent image is thus formed. The surface charge functions as an attracting force with respect to the charged coloring material particles 21 in the liquid developer 14. Therefore, the coloring material particles 21 are attracted onto the surface of the latent-image forming body 1, and the latent image is thus developed. The latent-image forming body 1 is rotating in the direction of arrow A as shown in FIG. 1, and the developer image on the surface of the latent-image forming body 1 is immediately transferred onto a sheet of paper 20, which is being carried by the paper-transporting device 19, at its contact portion.

Here, the following description will discuss Joule heat Q that is generated in the photoconductive layer 4 as described above. Supposing that the voltage is V, the current is I, the light-irradiation area (the surface area corresponding to one pixel region) is S, and the current density is J, the Joule heat Q, which is to be exerted in the photoconductive layer 4 is represented by an equation:

$$Q=VI=VSJ$$

And supposing that the heat capacity in the light-irradiation region is C, the temperature rise θ is represented by an equation:

$$\theta \equiv Q/C$$

Here, an explanation will be given on a process for increasing the temperature of one pixel region in printing by 100° C. by using concrete values.

For example, it is supposed that the light-irradiation area (the surface area of one pixel region) is represented by $S=10^{-4}$ m×$10^{-4}$ m=$10^{-8}$ m². Further, when for example PVDF/PZT is used as the pyroelectric-material layer 6, its specific heat is 2 joul/deg.g. Therefore, supposing that its specific gravity is 1 g/cm³ and its film thickness is $10^{-5}$m, the heat capacity of the light-irradiation region is represented by C=2 joul/deg. Moreover, when ZnO is used as the photoconductive layer 4, its electric conductivity σ upon irradiation of light is represented by:

$$\sigma=10^{-5} \Omega \cdot cm$$

Therefore, supposing that the thickness of the photoconductive layer 4 is d, the value of resistivity R is represented by:

$$R=1/\sigma \cdot (d/S)=10^6 \Omega$$

Thus, when the voltage V=200 V and the light-irradiation time t=1 msec, the Joule heat Q to be generated is calculated as:

Q=2×$10^{-5}$ joul; this makes it possible to increase the temperature by 100° C. Here, the heat-applying time is only not more than 1 msec, because the pixel area, the film thickness and the specific heat are small.

This temperature rise causes a charge that is represented by the variation ΔP between the amounts of temperature change in the spontaneous polarization value Ps, on the surface of the pyroelectric-material layer 6. Supposing that the pyroelectric coefficient is γ, the following equation holds:

$$\Delta P = \gamma \times \theta$$

Since the pyroelectric coefficient γ of PVDF/PZT is 0.5×$10^{-8}$ coulomb/cm²K, $$\Delta P = 5 \times 10^{-7} \text{ coulomb/cm}^2$$

Therefore, the surface charge per one pixel is 0.05 n coulomb. This value is 50 times as much as the quantity of charge that is required for a developing operation. Supposing that, in each pixel,. the quantity of surface charge caused by the pyroelectric effect is q, the electrostatic capacity is $C_0$, and the area and the film thickness thereof are respectively S and d, as well as supposing that the dielectric constant and permittivity of the pyroelectric material are respectively εr and $\epsilon_0$, the surface electric potential V to be generated is represented by the following equation:

$$V=q/C_0=q/(\epsilon r \, \epsilon_0 \, S/d)$$

Therefore, when a temperature rise of 100° C. is applied to the pyroelectric material that is made of PVDF/PZT, the surface electric potential V is given as:

$$V = 0.05 \, nC \div (100 \times 10^{-11} \times (10^{-4})^2/10^{-5})$$
$$= 50 \, V$$

Thus, it is possible to obtain 50 V as the surface electric potential V of the pyroelectric-material layer 6 by applying a voltage of 200 V across the transparent electrode layer 3 and the electrode layer 5.

As described above, in the image-forming method of the present embodiment, conductive carriers are generated in the photoconductive layer 4 by irradiating information light onto the photoconductive layer 4 by using the LED array 8 that is placed at an inner location of the transparent cylindrical base 2. Then, Joule heat is generated at the light-irradiation portion of the photoconductive layer 4 by applying a predetermined voltage across the transparent electrode layer 3 and the electrode layer 5. The heat is conducted to the pyroelectric-material layer 6 made of a dielectric substance, and the pyroelectric-material layer 6 is subject to a temperature rise such that a charge is generated on its surface due to the pyroelectric effect. This phenomenon results in an electrostatic latent image on the surface of the pyroelectric-material layer 6. Then, the electrostatic latent image is developed by allowing the liquid developer 14, which has been charged to have the polarity reversed to that of the electrostatic latent image, to be attracted by the electrostatic latent image.

Moreover, the liquid developer 14, which is used for developing the image formed on the pyroelectric-material layer 6, is preliminarily charged to have the polarity reversed to the charge generated in the pyroelectric-material layer 6. This makes it possible to eliminate the conventional charging device and also to eliminate the magnetic transport means.

Therefore, this arrangement simplifies the image-forming process, making it possible to make the apparatus compact and also to reduce the production cost.

Furthermore, since the liquid developer 14 is not magnetized, there is no problem of degradation in image characteristics, such as chroma and transparency, that is caused by the presence of ferro-magnetic fine particles, such as iron oxide. Therefore, it is possible to provide an image-forming method which achieves high-definition recording by eliminating unwanted factors to image characteristics that tend to be caused by developers.

Moreover, the electrostatic latent image, formed on the pyroelectric-material layer 6 of the latent-image forming body 1, disappears when the spontaneous polarization is recovered as the temperature drops, unless the pyroelectric-material layer 6 is heated so as to keep temperatures exceeding its Curie temperature. However, since the developing device 9 is installed at an outside position that is opposite the light-irradiation surface, the electrostatic latent image is immediately developed, and after the development, it is directly transferred onto a sheet of paper 20 by the paper-transporting device 19 that is installed on the rotation-direction side of the latent-image forming body 1 with respect to the developing device 9. Thus, it is possible to obtain a high-definition image on the actual sheet of paper 20.

Furthermore, the liquid developer 14, which is a colloidal matter consisting of, at least, an insulating solvent, coloring material particles and a charge-control agent, is used as developer. That is, wet developers which are well known to the art may be adopted as the liquid developer 14.

The coloring material particles in the insulating solvent in the liquid developer 14 are in a charged state, and the coloring material particles, which are subjected to electrophoretic force in the solvent, are attracted onto the pyroelectric-material layer 6 due to the charge of the pyroelectric-material layer 6. This makes it possible to eliminate a frictional charging device that is required for powdered developers, thereby further simplifying the image-forming process. Thus, it becomes possible to make the apparatus compact and also to reduce the production cost.

Furthermore, since the quantity of charge of the coloring material particles is easily varied by the addition of the charge-control agent, it is possible to develop even low-voltage latent images by increasing the quantity of charge; this makes it possible to improve the operability in the image-forming method.

Further, the use of a ferro-electric substance in the formation of the pyroelectric-material layer 6 makes it possible to increase the spontaneous polarization value Ps that is used for causing the pyroelectric effect. As a result, the temperature rise can be minimized upon generating a charge in the pyroelectric-material layer 6, and the voltage to be applied between the transparent electrode layer 3 and the electrode layer 5 is thus minimized. In other words, the quantity of generation of the surface charge, which depends on the temperature change, can be increased. Therefore, this arrangement simplifies the image-forming process, making it possible to make the apparatus compact and also to reduce the production cost.

Moreover, in the present embodiment, the latent-image forming body 1 is formed into a cylindrical shape, and the LED array 8 is housed inside this cylindrical structure. This makes the entire printer device compact.

Furthermore, in the present embodiment, the cleaning blade 18 for cleaning the pyroelectric-material layer 6 is installed on the side opposite to the rotation direction of the latent-image forming body 1 with respect to the developing device 9.

This arrangement allows the surface of the latent-image forming body 1, which is used in a cyclic manner, to be cleaned prior to the next writing process. Therefore, it is possible to initiate the new writing process, after liquid developer 14, which partially remains on the surface of the latent-image forming body 1 after the transferring process, has been completely removed therefrom. Thus, it is possible to improve the quality in the image formation.

Figure 6:
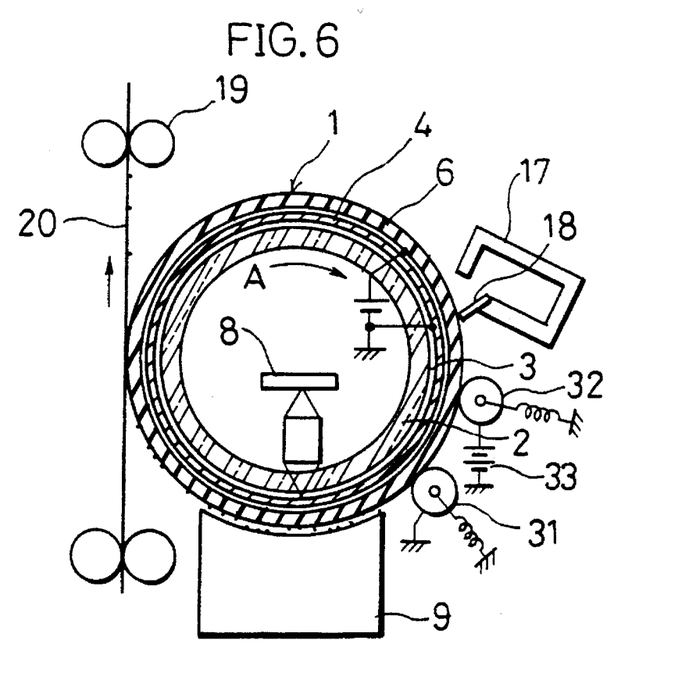
FIG. 6 is a schematic side view of a printer to which an image-forming method in another embodiment of the present invention is applied.

Referring to FIG. 6, the following description will discuss an arrangement of another embodiment wherein the pyroelectric material is heated above the Curie point.

In other words, as shown in FIG. 6, the image-forming method of the present embodiment is provided with a static eliminating roller 31 that functions as a static eliminating means for erasing excessive charge and that is installed at a position on the side opposite to the rotation direction of the latent-image forming body 1 with respect to the irradiation position of the LED array 8 in the latent-image forming body 1. The static eliminating roller 31 is in contact with the pyroelectric-material layer 6 and is also grounded.

Moreover, at a position on the side opposite to the rotation direction of the latent-image forming body 1 with respect to the static eliminating roller 31, is installed a re-polarization roller 32 that functions as a re-polarization means and that is installed in contact with the pyroelectric-material roller 6. An auxiliary re-polarization power source 33, installed in the re-polarization roller 32, is designed to apply voltage onto the pyroelectric-material layer 6. Additionally, in the present embodiment, the waste-toner box 17 is placed at a position on the side opposite to the rotation direction of the latent-image forming body 1 with respect to the re-polarization roller 32. The other arrangements except for these are the same as the arrangements of Embodiment 1.

In the image-forming method of the present embodiment, when the latent-image forming body 1 is subjected to a developing process, the re-polarization roller 32, having the re-polarization power source 33, applies a voltage to the pyroelectric-material layer 6 beforehand, thereby reproducing the spontaneous polarization of the pyroelectric-material layer 6. Further, the static eliminating roller 31 eliminates excessive charge that has been accumulated during the re-polarization process.

Next, conductive carriers are generated in the photoconductive layer 4 by irradiating information light onto the photoconductive layer 4 by using the LED array 8 that is placed at an inner location of the transparent cylindrical base 2. Then, by applying a predetermined voltage between the transparent electrode layer 3 and the electrode layer 5, heat is generated at the light-irradiation portion of the photoconductive layer 4 so that the pyroelectric-material layer 6 has a temperature rise above the Curie point. The temperature rise of the pyroelectric-material layer 6 due to the heat generates a charge on its surface because of the pyroelectric effect so that an electrostatic latent image is formed thereon. Then, the electrostatic latent image is developed by allowing the liquid developer 14, which has been charged to have the polarity reversed to that of the electrostatic latent image, to be attracted by the electrostatic latent image.

The electrostatic latent image is not eliminated immediately since the pyroelectric-material layer 6, which has been heated above the Curie point, no longer exhibits its spontaneous polarization. Therefore, the developing device 9 is not necessarily installed at a position outside the latent-image forming body 1 that is opposite the irradiated surface by light from the LED array 8. This makes it possible to increase the degree of freedom in designing the apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-forming method, which uses a latent-image-forming body wherein a transparent electrode layer, a photoconductive layer, an electrode layer and a pyroelectric-material layer made up of a dielectric substance are successively stacked on a transparent base, comprising the steps of:

generating conductive carriers inside the photoconductive layer by irradiating information light onto the photoconductive layer from the transparent base side by using a light source installed at an opposing position to the transparent base;

forming an electrostatic latent image by applying a voltage across the transparent electrode layer and the electrode layer so that Joule heat is exerted at the irradiated portion of the photoconductive layer by the light source, the heat being conducted to the pyroelectric-material layer to cause a temperature rise in the pyroelectric-material layer so that a charge is exerted on its surface because of the pyroelectric effect; and developing the electrostatic latent image by allowing developer, charged to have a polarity reversed to that of the electrostatic latent image, to be attracted to the electrostatic latent image.

2. The image-forming method as defined in claim 1, wherein the developer is a liquid developer consisting of an insulating solvent and coloring material particles contained therein.

3. The image-forming method as defined in claim 1, wherein the pyroelectric-material layer is made of a ferroelectric substance.

4. An image-forming method, which uses a latent-image-forming body that is provided with a transparent electrode layer, a photoconductive layer, an electrode layer and a pyroelectric-material layer made up of a dielectric substance which are successively stacked on a transparent base, and that is formed into a cylindrical shape with the transparent base placed as an innermost layer so as to rotate in one direction, comprising the steps of:

generating conductive carriers inside the photoconductive layer by irradiating information light onto the photoconductive layer from the transparent base side by using a light source installed at an opposing position to the transparent base;

forming an electrostatic latent image by applying a voltage across the transparent electrode layer and the electrode layer so that Joule heat is exerted at the irradiated portion of the photoconductive layer by the light source, the heat being conducted to the pyroelectric-material layer to cause a temperature rise exceeding a Curie point in the pyroelectric-material layer so that a charge is exerted on its surface because of the pyroelectric effect;

developing the electrostatic latent image by allowing developer, charged to have a polarity reversed to that of the electrostatic latent image, to be attracted to the electrostatic latent image;

operative after the preceding step, applying an electric field to the surface of the pyroelectric-material layer so as to allow the pyroelectric-material layer to recover its spontaneous polarization; and operative after the preceding step, eliminating excessive charge from the surface of the pyroelectric-material layer.

5. An image-forming apparatus comprising:

a latent-image-forming body wherein a transparent electrode layer, a photoconductive layer that generates conductive carriers upon receipt of light, an electrode layer and a pyroelectric-material layer that is made up of a dielectric substance and generates a charge on the surface thereof due to the pyroelectric effect when subjected to a temperature rise, are successively stacked on a transparent base;

a light source for irradiating information light onto the photoconductive layer from the transparent base side, the light source being installed at a position opposing to the transparent base;

a power source for applying a voltage across the transparent electrode layer and the electrode layer so that Joule heat is exerted at the irradiated portion of the photoconductive layer by the light source, the heat being conducted to the pyroelectric-material layer; and a developer-supplying means for developing an electrostatic latent image formed on the surface of the pyroelectric-material layer due to the pyroelectric effect by supplying a developer, which has been charged to have a polarity reversed to that of the electrostatic latent image, to the electrostatic latent image.

6. The image-forming apparatus as defined in claim 5, wherein the light source includes a light-emitting diode array.

7. The image-forming apparatus as defined in claim 6, wherein the image-forming body is formed into a cylindrical shape with the transparent base placed as an innermost layer and the light-emitting diode array is installed at a position inside the transparent base.

8. The image-forming method as defined in claim 5, wherein the developer is a liquid developer consisting of an insulating solvent and coloring material particles contained therein.

9. The image-forming apparatus as defined in claim 5, wherein the image-forming body is formed into a cylindrical shape with the transparent base placed as an innermost layer so as to rotate in one direction and the power source is arranged to exert Joule heat at the light irradiation portion of the photoconductive layer, the heat being set to cause a temperature rise exceeding a Curie point in the pyroelectric-material layer, further comprising:

a re-polarization means for applying an electric field onto the surface of the pyroelectric-material layer so as to allow the pyroelectric-material layer to recover its spontaneous polarization, the re-polarization means being installed at a position on the side opposite to the rotation direction of the image-forming body with respect to the developer-supplying means; and a static-eliminating means for eliminating excessive charge from the pyroelectric-material layer.

10. The image-forming apparatus as defined in claim 5, wherein the pyroelectric-material layer is made of a ferroelectric substance.

11. The image-forming method as defined in claim 4, wherein the developer is a liquid developer consisting of an insulating solvent and coloring material particles contained therein.

12. The image-forming method as defined in claim 4, wherein the pyroelectric-material layer is made of a ferroelectric substance.

13. The image-forming method as defined in claim 2, wherein the liquid developer is impregnated into a porous member.

14. The image-forming method as defined in claim 8, wherein the liquid developer is impregnated into a porous member.

15. The image-forming method as defined in claim 11, wherein the liquid developer is impregnated into a porous member.

* * * * *